US011693090B2

(12) United States Patent
Zheng et al.

(10) Patent No.: US 11,693,090 B2
(45) Date of Patent: *Jul. 4, 2023

(54) MULTI-DOMAIN NEIGHBORHOOD EMBEDDING AND WEIGHTING OF SAMPLED DATA

(71) Applicant: Aptiv Technologies Limited, St. Michael (BB)

(72) Inventors: Yang Zheng, Winnetka, CA (US); Izzat H. Izzat, Simi Valley, CA (US)

(73) Assignee: Aptiv Technologies Limited, St. Michael (BB)

( * ) Notice: Subject to any disclaimer, the term of this patent is extended or adjusted under 35 U.S.C. 154(b) by 9 days.

This patent is subject to a terminal disclaimer.

(21) Appl. No.: 17/650,661

(22) Filed: Feb. 10, 2022

(65) Prior Publication Data

US 2022/0165065 A1 May 26, 2022

Related U.S. Application Data

(63) Continuation of application No. 17/080,822, filed on Oct. 26, 2020, now Pat. No. 11,281,917.

(Continued)

(51) Int. Cl.
*G01S 7/41* (2006.01)
*G01S 17/894* (2020.01)
(Continued)

(52) U.S. Cl.
CPC ............ *G01S 7/414* (2013.01); *G01S 17/894* (2020.01); *G05D 1/0251* (2013.01);
(Continued)

(58) Field of Classification Search
CPC ........ G01S 7/414; G01S 17/894; G01S 7/417; G01S 13/931; G01S 17/931;
(Continued)

(56) References Cited

U.S. PATENT DOCUMENTS 9,805,601 B1 * 10/2017 Fields .................. G08G 1/0129
9,817,125 B2 * 11/2017 Liu ......................... G01S 19/39
(Continued)

FOREIGN PATENT DOCUMENTS

CA          2796162 A1 * 10/2012 ............. G01C 11/02
CA          3093836 A1 *  9/2019 ......... G06K 9/00335
(Continued)

OTHER PUBLICATIONS

"Extended European Search Report", EP Application No. 20204179.4, dated Mar. 24, 2021, 13 pages.

(Continued)

*Primary Examiner* — Mahendra R Patel
(74) *Attorney, Agent, or Firm* — Sawtooth Patent Group PLLC

(57) ABSTRACT

This document describes "Multi-domain Neighborhood Embedding and Weighting" (MNEW) for use in processing point cloud data, including sparsely populated data obtained from a lidar, a radar, a camera, or combination thereof. MNEW is a process based on a dilation architecture that captures pointwise and global features of the point cloud data involving multi-scale local semantics adopted from a hierarchical encoder-decoder structure. Neighborhood information is embedded in both static geometric and dynamic feature domains. A geometric distance, feature similarity, and local sparsity can be computed and transformed into adaptive weighting factors that are reapplied to the point cloud data. This enables an automotive system to obtain outstanding performance with sparse and dense point cloud data. Processing point cloud data via the MNEW techniques promotes greater adoption of sensor-based autonomous driving and perception-based systems.

20 Claims, 8 Drawing Sheets

Related U.S. Application Data

(60) Provisional application No. 62/928,572, filed on Oct. 31, 2019.

(51) Int. Cl.
```
G05D 1/02        (2020.01)
G06V 20/56       (2022.01)
G06F 18/22       (2023.01)
G06F 18/2136     (2023.01)
G06V 10/764      (2022.01)
G06V 10/82       (2022.01)
```

(52) U.S. Cl.
CPC ......... *G05D 1/0257* (2013.01); *G05D 1/0278* (2013.01); *G06F 18/2136* (2023.01); *G06F 18/22* (2023.01); *G06V 10/764* (2022.01); *G06V 10/82* (2022.01); *G06V 20/56* (2022.01); *G05D 2201/0213* (2013.01)

(58) Field of Classification Search
CPC ............... G01S 15/931; G01S 13/89; G01S 2013/9323; G01S 2013/9324; G01S 7/4802; G01S 17/89; G05D 1/0251; G05D 1/0257; G05D 1/0278; G05D 2201/0213; G06F 18/2136; G06F 18/22; G06V 10/764; G06V 10/82; G06V 20/56; G06N 3/045
USPC ........................................................ 382/104
See application file for complete search history.

(56) References Cited

U.S. PATENT DOCUMENTS

| | | | |
|---|---|---|---|
| 10,885,647 B2 * | 1/2021 | Tamarozzi | G06T 7/70 |
| 11,010,630 B2 * | 5/2021 | Yang | G06T 7/246 |
| 11,010,928 B2 | 5/2021 | Mammou et al. | |
| 11,531,110 B2 * | 12/2022 | Lu | G01S 17/931 |
| 2012/0075342 A1 * | 3/2012 | Choubassi | G06T 17/00 345/633 |
| 2014/0122039 A1 * | 5/2014 | Xu | G06F 18/213 703/2 |
| 2017/0046840 A1 * | 2/2017 | Chen | G01C 21/36 |
| 2017/0158239 A1 * | 6/2017 | Dhome | G01C 22/025 |
| 2018/0047107 A1 | 2/2018 | Perl et al. | |
| 2018/0095450 A1 | 4/2018 | Lappas et al. | |
| 2018/0121765 A1 | 5/2018 | Takimoto | |
| 2018/0341263 A1 * | 11/2018 | Rust | G05D 1/0257 |
| 2019/0081638 A1 * | 3/2019 | Mammou | H04N 19/436 |
| 2019/0096086 A1 | 3/2019 | Xu et al. | |
| 2019/0120931 A1 * | 4/2019 | Mihajlovic | G06T 7/70 |
| 2019/0178654 A1 * | 6/2019 | Hare | G06T 7/70 |
| 2019/0266748 A1 | 8/2019 | Ahmad et al. | |
| 2019/0323844 A1 * | 10/2019 | Yendluri | G06T 9/00 |
| 2020/0019815 A1 * | 1/2020 | Balu | G06T 9/00 |
| 2020/0064180 A1 | 2/2020 | Gonçalves | |
| 2020/0111358 A1 * | 4/2020 | Parchami | G08G 1/056 |
| 2020/0219272 A1 | 7/2020 | Pizer et al. | |
| 2020/0302651 A1 * | 9/2020 | Flynn | G08G 1/056 |
| 2021/0049779 A1 * | 2/2021 | Harviainen | G06F 18/213 703/2 |

FOREIGN PATENT DOCUMENTS

| | | | |
|---|---|---|---|
| CN | 104221031 A * | 12/2014 | G06F 16/50 |
| CN | 110832348 A * | 2/2020 | B60W 40/06 |
| JP | 3565749 B2 * | 9/2004 | G01B 11/272 |
| JP | 2004294420 A * | 10/2004 | G01S 7/4863 |
| WO | WO-2009015655 A2 * | 2/2009 | G06K 9/6215 |
| WO | WO-2016118672 A2 * | 7/2016 | G01S 7/4863 |

OTHER PUBLICATIONS

Armeni, et al., "3D Semantic Parsing of Large-Scale Indoor Spaces", Jun. 2016, pp. 1534-1543, 10 pages.
Behley, et al., "A Dataset for Semantic Segmentation of Point Cloud Sequences", Apr. 2, 2019, 18 pages.
Caltagirone, et al., "Fast LIDAR-based Road Detection Using Fully Convolutional Neural Networks", Mar. 29, 2017, 6 pages.
Chang, et al., "ShapeNet: An Information-Rich 3D Model Repository", Dec. 9, 2015, 11 pages.
Chen, et al., "Multi-View 3D Object Detection Network for Autonomous Driving", Jun. 22, 2017, 9 pages.
Dai, et al., "ScanNet: Richly-annotated 3D Reconstructions of Indoor Spaces", Apr. 11, 2017, 22 pages.
De Brabandere, "Semantic Instance Segmentation with a Discriminative Loss Function", Aug. 8, 2017, 10 pages.
Engelmann, et al., "Exploring Spatial Context for 3D Semantic Segmentation of Point Clouds", Dec. 18, 2019, 9 pages.
Geiger, et al., "Are We Ready for Autonomous Driving? The KITTI Vision Benchmark Suite", Jun. 2012, 8 pages.
Hackel, et al., "Semantic3D.Net: A New Large-scale Piont Cloud Classification Benchmark", Apr. 12, 2017, 9 pages.
Haykin, "Neural Networks—A Comprehensive Foundation", Second Edition—Prentice Hall 1994, 823 pages.
Huang, et al., "Point Cloud Labeling using 3D Convolutional Neural Network", Dec. 2016, 6 pages.
Jiang, et al., "PointSIFT: A SIFT-like Network Module for 3D Point Cloud Semantic Segmentation", Nov. 24, 2018, 10 pages.
Komarichev, et al., "A-CNN: Annularly Convolutional Neural Networks on Point Clouds", Jun. 2019, 10 pages.
Krizhevsky, et al., "ImageNet Classification with Deep Convolutional Neural Networks", May 2017, 9 pages.
Landrieu, et al., "Large-scale Point Cloud Semantic Segmentation with Superpoint Graphs", Mar. 28, 2018, 12 pages.
Landrieu, et al., "Point Cloud Over-segmentation with Graph-structured Deep Metric Learning", Jan. 2019, pp. 7440-7449, 10 pages.
Lawin, et al., "Deep Projective 3D Semantic Segmentation", May 9, 2017, 12 pages.
Li, "3D Fully Convolutional Network for Vehicle Detection in Point Cloud", Jan. 16, 2017, 5 pages.
Liu, et al., "Relation-shape Convolutional Neural Network for Point Cloud Analysis", May 26, 2019, 11 pages.
Long, et al., "Fully Convolutional Networks for Semantic Segmentation", Mar. 8, 2015, 10 pages.
Maturana, et al., "VoxNet: A 3D Convolutional Neural Network for Real-Time Object Recognition", Oct. 2015, 7 pages.
Meyer, et al., "LaserNet: An Efficient Probabilistic 3D Object Detector for Autonomous Driving", Mar. 20, 2019, 10 pages.
Meyer, et al., "Sensor Fusion for Joint 3D Object Detection and Semantic Segmentation", Apr. 25, 2019, 8 pages.
Qi, et al., "PointNet: Deep Learning on Point Sets for 3D Classification and Segmentation", Conference on Computer Vision and Pattern Recognition (CVPR) 2017, Jul. 2017, pp. 652-660, 9 pages.
Qi, et al., "PointNet++: Deep Hierarchical Feature Learning on Point Sets in a Metric Space", Jun. 7, 2017, 14 pages.
Qi, et al., "Volumetric and Multi-View CNNs for Object Classification on 3D Data", Apr. 29, 2016, 14 pages.
Rao, et al., "Spherical Fractal Convolutional Neural Networks for Point Cloud Recognition", Jun. 2019, 9 pages.
Riegler, et al., "OctNet: Learning Deep 3D Representations at High Resolutions", Apr. 10, 2017, 21 pages.
Roynard, et al., "Paris-Lille-3D: A Large and High-quality Ground-Truth Urban Point Cloud Dataset for Automatic Segmentation Classification", Apr. 2018, pp. 545-557, 13 pages.
Simonovsky, et al., "Dynamic Edge-Conditioned Filters in Convolutional Neural Networks on Graphs", Aug. 8, 2017, 12 pages.
Su, et al., "Multi-view Convolutional Neural Networks for 3D Shape Recognition", May 2015, 9 pages.
Tatarchenko, "Tangent Convolutions for Dense Prediction in 3D", Jul. 6, 2018, 13 pages.
Tchapmi, et al., "SEGCloud: Semantic Segmentation of 3D Point Clouds", Oct. 20, 2017, 21 pages.

(56) References Cited

OTHER PUBLICATIONS

Thomas, et al., "KPConv: Flexible and Deformable Convolution for Point Clouds", Aug. 19, 2019, 15 pages.
Veer Sain, et al., "Recommendations with Sparsity Based Weighted Context Framework", Jul. 4, 2018, 17 pages.
Wang, et al., "Associatively Segmenting Instances and Semantics in Point Clouds", Feb. 28, 2019, 10 pages.
Wang, et al., "Dynamic Graph CNN for Learning on Point Clouds", Jun. 11, 2019, 13 pages.
Wang, et al., "Graph Attention Convolution for Point Cloud Semantic Segmentation", Jun. 2019, pp. 10296-10305, 10 pages.
Weinberger, et al., "Distance Metric Learning for Large Margin Nearest Neighbor Classification", Jan. 2006, 8 pages.
Wu, "SqueezeSeg: Convolutional Neural Nets with Recurrent CRF for Real-Time Road-Object Segmentation from 3D LiDAR Point Cloud", Oct. 19, 2017, 7 pages.
Wu, et al., "3D ShapeNets: A Deep Representation for Volumetric Shapes", Apr. 2015, 9 pages.
Wu, et al., "PointConv: Deep Convolutional Networks on 3D Point Clouds", Apr. 11, 2019, 10 pages.
Yu, et al., "Multi-Scale Context Aggregation by Dilated Convolutions", Apr. 30, 2016, 13 pages.
Zhao, et al., "PointWeb: Enhancing Local Neighborhood Features for Point Cloud Processing", Jun. 2019, 9 pages.
Zheng, et al., "GFD-SSD: Gated Fusion Double SSD for Multispectral Pedestrian Detection", Mar. 16, 2019, 10 pages.
Zheng, et al., "MNEW: Multi-domain Neighborhood Embedding and Weighting for Sparse Point Clouds Segmentation", Apr. 5, 2020, 10 pages.

* cited by examiner

MULTI-DOMAIN NEIGHBORHOOD EMBEDDING AND WEIGHTING OF SAMPLED DATA

CROSS-REFERENCE TO RELATED APPLICATIONS

This application is a continuation of U.S. patent application Ser. No. 17/080,822, filed Oct. 26, 2020, which claims the benefit of U.S. Provisional Patent Application No. 62/928,572, filed Oct. 31, 2019, the disclosures of which are incorporated in their entireties by reference herein.

BACKGROUND

Some automotive systems include sophisticated sensor equipment configured to capture and process point cloud data for representing and interpreting semantics of a three-dimensional (3D) scene. Point cloud data (e.g., lidar data, radar data, ultrasound data, camera data, other sensor data) obtained in furtherance of many common automotive tasks, for example, shape segmentation or indoor scenario parsing, is typically much denser than other point cloud data normally acquired while interpreting semantics of an outdoor scene. Although many ways to process point cloud data exist, their effectiveness depreciates as the point cloud data becomes less dense.

SUMMARY

This document describes point cloud processing through "Multi-domain Neighborhood Embedding and Weighting" (MNEW) for use in processing point cloud data, including sparsely populated data obtained from a lidar, a camera, a radar, or combination thereof. MNEW is a process based on a dilation architecture that captures pointwise and global features of the point cloud data involving multi-scale local semantics adopted from a hierarchical encoder-decoder structure. Neighborhood information is embedded in both static geometric and dynamic feature domains. A geometric distance, feature similarity, and local sparsity can be computed and transformed into adaptive weighting factors that are reapplied to the point cloud data. This enables an automotive system to obtain outstanding performance with sparse and dense point cloud data. Processing point cloud data via the MNEW techniques promotes greater adoption of sensor-based autonomous driving and perception-based systems.

In one example, a method includes obtaining point cloud data from one or more sensors of a vehicle, determining geometric properties of the point cloud data by at least determining geometric distances between points in the point cloud data, and determining feature properties of the point cloud data including feature similarities of the points. The method further includes modifying the point cloud data by embedding a respective weighting at each point in the point cloud data, the respective weighting being based on: the geometric distances that are between that point and other points in the point cloud data; a sparsity of the point cloud data at that point; and the feature similarities of that point and the other points in the point cloud data. The method further includes responsive to modifying the point cloud, executing a vehicle operation using the respective weightings embedded in the modified point cloud data.

This document a system includes a processor configured to perform the above-summarized method, as well as, describing means for performing the above-summarized method and other methods set forth herein, in addition to describing methods performed by the above-summarized systems and methods performed by other systems set forth herein.

This summary introduces simplified concepts of multi-domain neighborhood embedding and weighting for point cloud processing, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of multi-domain neighborhood embedding and weighting for point cloud processing are described in this document with reference to the following figures. The same numbers are often used throughout the drawings to reference like features and components.

FIG. 5-1 illustrates an example of a dense point cloud processed by an automotive system configured to process point clouds using multi-domain neighborhood embedding and weighting.

FIG. 5-2 illustrates an example of a sparse point cloud processed by an automotive system configured to process point clouds using multi-domain neighborhood embedding and weighting.

FIG. 6-1 illustrates an example point cloud distribution and performance variation by distance.

FIG. 6-2 illustrates an example point cloud distribution and performance variation by sparsity.

DETAILED DESCRIPTION

Overview

Figure 1:
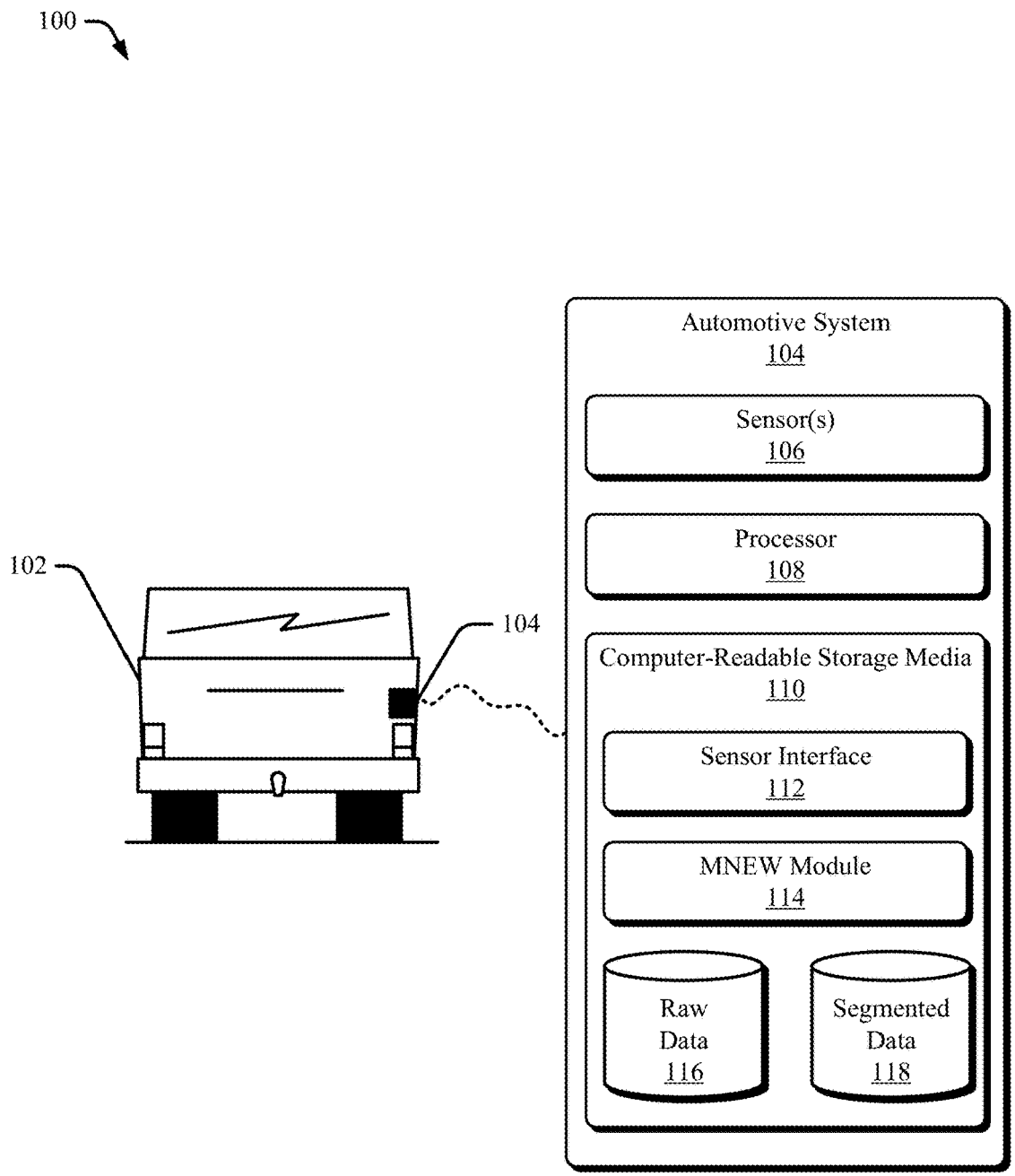
FIG. 1 illustrates an example of an environment in which multi-domain neighborhood embedding and weighting for point cloud processing is performed by an automotive system.

Point cloud data is preferred for executing some autonomous driving or other vehicle perception-related tasks, for example, three-dimensional shape recognition, scene segmentation, indoor scenario parsing, and outdoor scene interpretation on a large-scale. Lidar point clouds, when compared against point cloud data generated from other types of sensors, for example, camera and radar, have an advantage in vehicle-perception because lidar point clouds can capture both real distance measurements and fine semantic descriptions. In research areas related to computer vision, studies about point clouds are most concerned with dense data sets. For example, topics for example: three-dimensional shape recognition, part segmentation, indoor scenario parsing, and large-scale outdoor scene interpretations are studied using densely populated point clouds or data sets. Several benchmark data sets, including ModelNet40, ShapeNet, S3DIS, and Semantic3D, have been established to test performance related to these topics. These data sets have spatial properties that are unlike spatial properties of actual data obtained during real-world sensor scans (e.g., by an on-board lidar or another vehicle-mounted sensor). Furthermore, point cloud data tends to be even sparser when generated from a real-world sweep of a vehicle's surrounding environment as compared to an interior scan of a cabin; this is because sparsity of a point cloud increases as distance to an object becomes greater.

There have generally been three different approaches to processing point clouds. A first approach is to generate a projection from two-dimensional (2D) representations; the basic idea of this approach is to transform and stitch together unstructured point clouds into 2D images, which can be directly input into an image-based convolutional neural network. This works for a fusion-sensor system that combines sensor data from multiple different sources. A drawback to these 2D projections is a potential loss of information when a large number of points are occluded from a field-of-view.

Another approach involves voxelization into 3D volumetric grids of cells or a structural variation thereof (e.g., octree, spherical). Although 3D voxelization is better at maintaining points in a 3D space, a 3D convolution may suffer a similar loss of information due to occlusions, and a 3D convolution can also be computationally expensive. There may also be processing difficulty when working with a 3D convolution.

Thirdly, a fundamental model called PointNet can process an unordered and unstructured point cloud, which inspires many other studies to research point cloud classification and segmentation. However, performance is only reported against several dense data benchmarks and their effectiveness for processing sparse data clouds is unknown.

VirtualKITTI, SemanticKITTI, and DeepenaiKITTI are some publicly available datasets that provide semantic labels for sparse point clouds. A comparison of the above-three approaches to directly processing raw point clouds reveals their ineffectiveness on processing sparse data. The network architecture, the neighbor points collection method, and local sparsity are the essential factors that cause changes to each of their performance.

In contrast to other approaches to point cloud processing and segmentation, this document describes Multi-domain Neighborhood Embedding and Weighting (MNEW), which is a process of embedding weights in point cloud data based on geometric distance, feature similarity, and/or neighborhood sparsity, no matter if the point cloud data is densely or sparsely populated. Particular point-wise details and global semantics are captured from the point cloud data, which is then applied to the point cloud data during a multi-scale local neighborhood segmentation process that executes in a static geometric domain and a dynamic feature space. These MNEW techniques, can configure an automotive system to achieve top performance processing sparsely populated point cloud data and dense data alike, including meeting or exceeding various state-of-the-art performance benchmarks (e.g., Semantic3D, S3DIS) that test performance against dense point cloud data.

Example Environments

FIG. 1 illustrates an example of an environment 100 in which multi-domain neighborhood embedding and weighting for point cloud processing is performed by an automotive system 104. In the depicted environment 100, the automotive system 104 is mounted to, or integrated within, a vehicle 102 that can travel on a roadway. The automotive system 104 can embed weightings in point cloud data generated by one or more sensors 106 onboard the vehicle 102. Although illustrated as a car, the vehicle 102 can represent other types of motorized vehicles (e.g., a motorcycle, a bus, a tractor, a semi-trailer truck, or construction equipment). In general, manufacturers can mount the automotive system 104 to any moving platform that can travel.

In the depicted implementation, a portion of the automotive system 104 is mounted into a taillight module or bumper. The automotive system 104 can project a field-of-view from any exterior surface of the vehicle 102. For example, vehicle manufacturers can integrate at least a part of the automotive system 104 into a rearview mirror, a side mirror, roof, or any other interior or exterior location. In general, vehicle manufacturers can design the location of the automotive system 104 to provide a particular field-of-view that sufficiently encompasses a roadway and surrounding environment in which the vehicle 102 may be traveling. The automotive system 104 includes one or more sensors 106, a processor 108, and a non-transitory computer-readable storage media 110.

The processor 108 can be a microprocessor or a system-on-chip of a computing device. The processor 108 executes computer-executable instructions stored within the non-transitory computer-readable storage media 110. As an example, the processor 108 can execute the MNEW module 114 and the sensor interface 112 to modify point cloud data for use in operating the vehicle 102. The processor 108 can also retrieve or store point cloud data from or to the non-transitory computer-readable storage media 110.

The sensors 106 generate point cloud data, including sparse and dense point cloud data. The point cloud data generated by the sensors 106 is obtained by a processor 108. The processor 108 receives the point cloud data as input and processes the data to embed weightings in the data that enable more efficient downstream processing by another system of the vehicle 102, for example, an object detection system or an autonomous or semiautonomous navigation system (neither is shown). The sensors 106 can include a camera, a radar system, a global positioning system (GPS), a lidar system, or any combination thereof. A camera can take photographic images or video of the road. A radar system or a lidar system can use electromagnetic signals to detect objects in the road. A GPS can determine a position and/or navigation of the vehicle 102.

The non-transitory computer-readable storage media 110 maintains instructions that when executed by the processor 108, cause the automotive system 104 to perform an operation or function. The non-transitory computer-readable storage media 110 can also store data for processing and processed data. For example, the non-transitory computer-readable storage media 110 includes a sensor interface 112, a MNEW module 114, a raw data store 116, and a segmented data store 118. When executed by the processor 108, the sensor interface 112 receives point cloud data generated by the sensors 106 and stores the point cloud data in the raw data store 116. The processor 108 may execute the MNEW module 114 to process contents of the raw data store 116 and produce modified or segmented data for the segmented data store 118. This document describes the operations of the MNEW module 114 of the automotive system 104 in greater detail with respect to FIG. 2.

Figure 2:
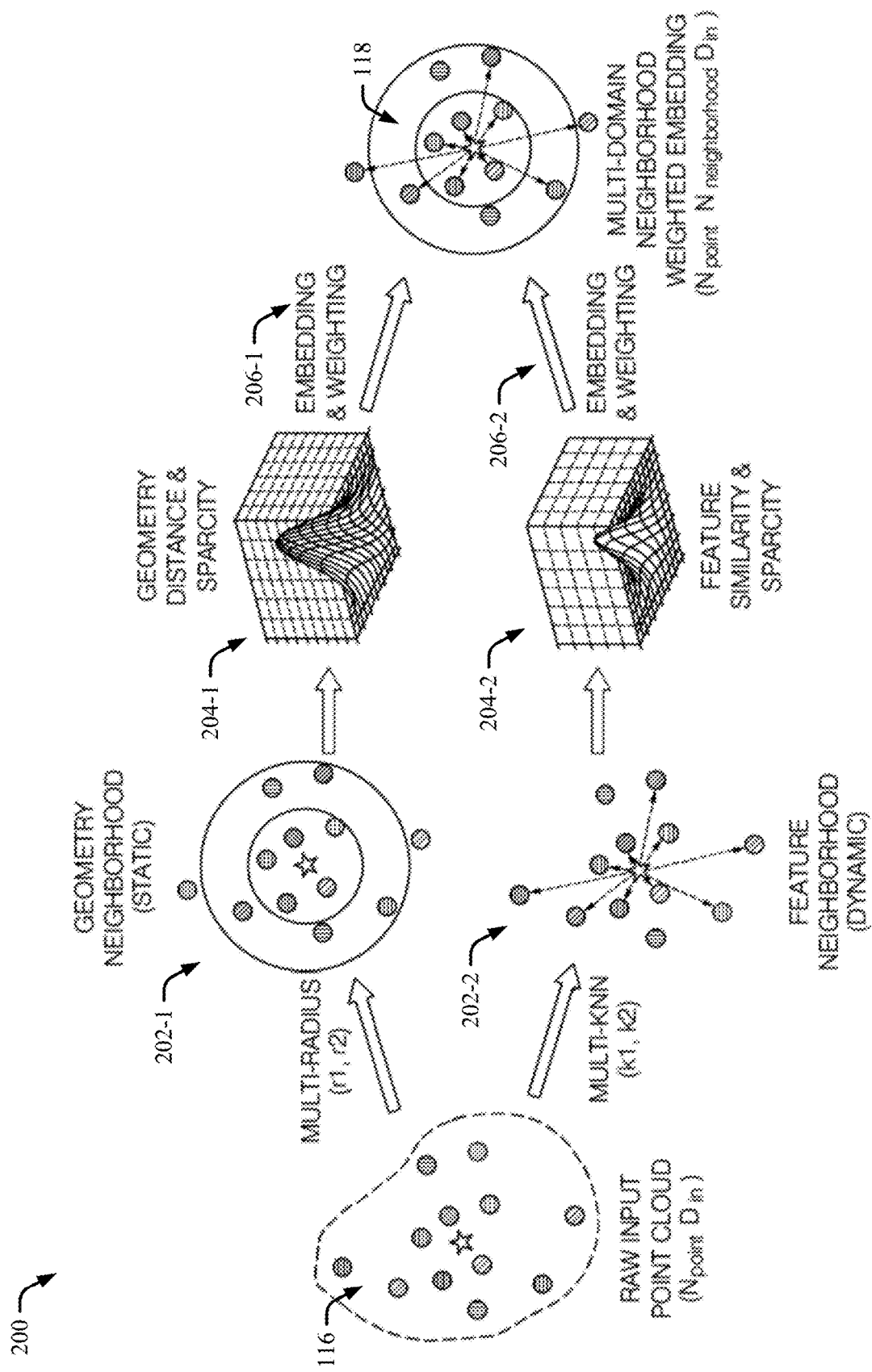
FIG. 2 illustrates an example process to modify point cloud data using multi-domain neighborhood embedding and weighting.

FIG. 2 illustrates an example process 200 to modify point cloud data using multi-domain neighborhood embedding and weighting. The MNEW module 114, when executed by the processor 108, obtains information contained in the raw data store 116 as input, and outputs segmented data for the segmented data store 118. The process 200 inherits aspects of the PointNet model mentioned above, which is able to capture pointwise details and global semantics in point cloud data. Going beyond PointNet, however, the MNEW module 114 enables point cloud data to embody local contextual information. In this way, unlike PointNet, the MNEW module 114 makes even sparse point cloud data usable for vehicle control or object detection. The process 200 excludes or refrains from subsampling and interpolation processing of point cloud data, which differs from previous systems that process point cloud data based on a hierarchical encoder-decoder structure.

The MNEW module 114 is configured to process raw point cloud data from the raw data store 116 by collecting static geometry neighbors and further collecting dynamic feature neighbors. For a query point (e.g., a star) within a set of point clouds (e.g., dots), the MNEW module 114 groups geometry neighbors based on distance (e.g., Euclid distance) towards a query point. This separation by distance (represented as two radius) is shown in FIG. 2 in the upper branch of the process 200. Through grouping feature neighbors based on similarities (e.g., using multiple k-nearest neighbors algorithms) that change across different network layers (as illustrated in the lower branch of the process 200), the MNEW module 114 generates a feature (dynamic) neighborhood domain 202-2. By grouping the geometry neighbors, the MNEW module 114 produces a geometry (static) neighborhood domain 202-1. Sparsity 204-1 and 204-2 of each neighbor point is computed in the geometry and feature domains 202-1, 202-2. A geometry sparsity 204-1 and a feature sparsity 204-2 at each neighbor point can be transformed into weighting factors 206-1 and 206-2. For each of the neighborhood points, the MNEW module 114 indicates a distance and similarity, which can then be used as weighting factors 206-1 and 206-2 that are applied to the raw point cloud data from the raw data store 116.

Applying the weighting factors 206-1 and 206-2 to the raw point cloud data produces modified (e.g., segmented) point cloud data for the segmented data store 118, which adopts the point cloud data for multiple scaling in multiple domains. In this way, while some other techniques for processing point cloud data compute geometry distance or feature similarity as fixed weighting factors, and while still others transform local sparsity as a machine learned variable, the MNEW module 114 treats geometry distance, feature similarity, and local contextual information including local sparsity each as trainable features of point cloud data that can be applied as embeddings and weightings. This is distinct with other techniques where neighbors, if even collected, are collected in only a single domain (e.g., either geometry or feature but not both).

Figure 3:
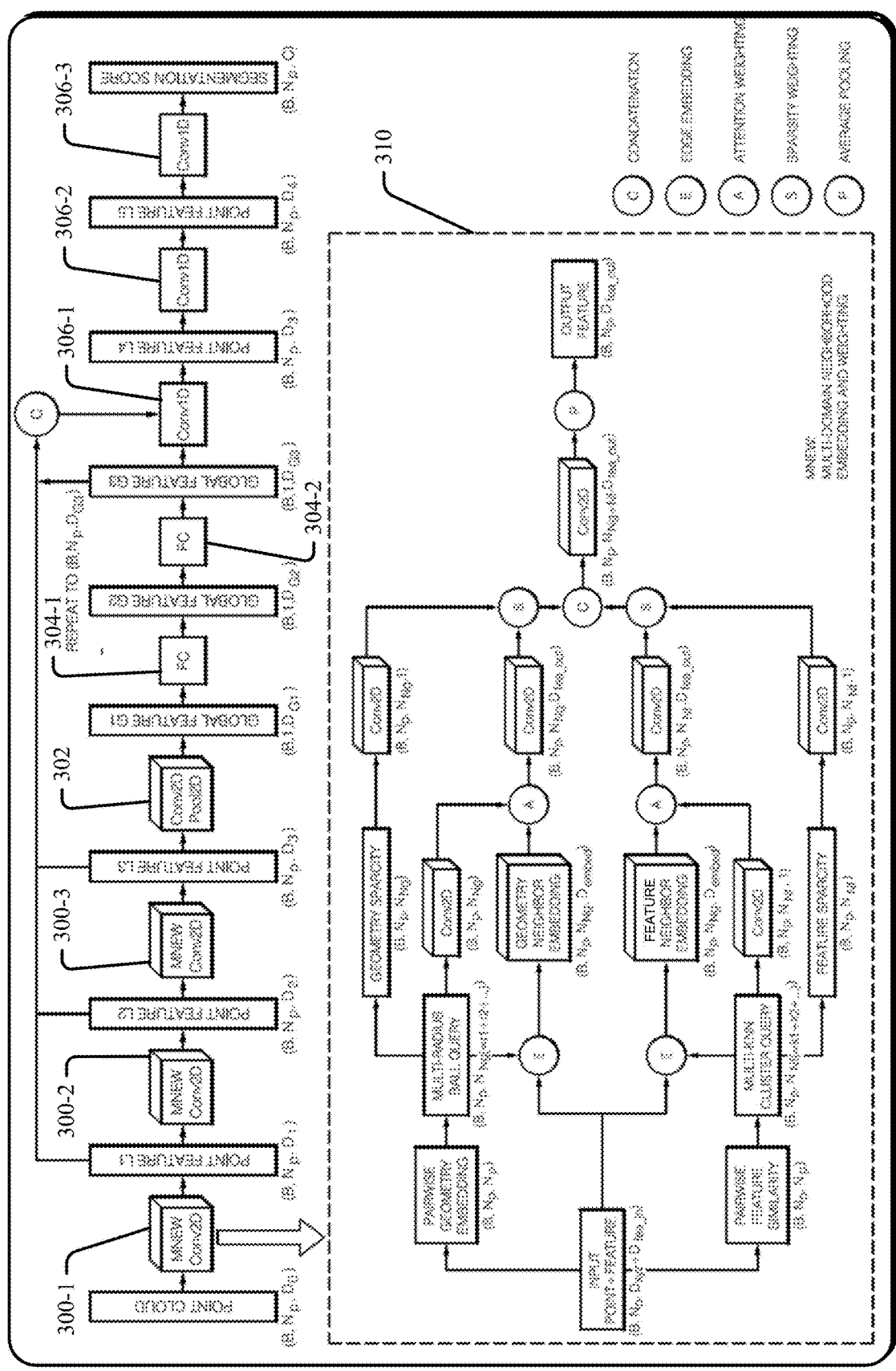
FIG. 3 illustrates in an example of a module configured to process point clouds through multi-domain neighborhood embedding and weighting.

FIG. 3 illustrates in an example of a module configured to process point clouds through multi-domain neighborhood embedding and weighting. MNEW module 114-1 is an example of the MNEW module 114. The MNEW module 114 receives point cloud data as input from the raw data store 116. The output from the MNEW module 114 is saved as segmented data including the raw point cloud data, having been embedded with weightings, including a segmentation score.

The overall architecture inherits a dilated structure like PointNet, which excludes down-sampling and up-sampling operations for changing resolution. Through access to the raw data store 116, the MNEW module 114-1 obtains (e.g., in batches) input $N_p$ points, and passes through a sequence of multiple MNEW submodules 300-1, 300-2, and 300-3 to extract pointwise features $L_1$, $L_2$, and $L_3$ in a hierarchical order. Three MNEW submodules are used in this example, however, additional, or fewer MNEW submodules may be used in other examples. Note that local neighborhood information is carried forward through the MNEW module 114-1, and through the MNEW submodules 300-1, 300-2, 300-3 (collectively "MNEW submodules 300"), which yields an improvement over PointNet and other techniques that cannot carry local neighborhood information through to the end.

The MNEW module 114-1 increases a quantity of neighbors in $L_1$, $L_2$, and $L_3$, but maintains a quantity of query points unchanged. The point cloud data stored at the raw data store 116 includes a same quantity of sampled points after being modified and stored as point cloud data at the segmented data store 118.

Following the MNEW modules 300, the MNEW module 114-1 includes a global 2D convolution and max pooling module 302, and two fully convolution layers 304-1, 304-2 are followed to aggregate the global feature $G_3$. The hierarchical pointwise features and tiled global feature are concatenated as a descriptor for each point and passed through multiple (e.g., three) regular 1D convolutions 306-1, 306-2, 306-3 to get the segmentation score. The segmentation score can indicate a probability or degree of likelihood associated with one or more possible, pointwise classifications.

An exploded view 310 of each of the MNEW submodules 300 is shown inside the MNEW module 114-1. As drawn in the exploded view 310, the input of each of the MNEW submodules 300 includes batches of points with their x, y, z coordinates and original features, shaped as [B, $N_p$, $D_{xyz}$+ $D_{fea}$]. The MNEW submodules 300 compute pairwise distances in both the geometry and feature domains, resulting in two matrices 312-1, 312-2, each with shape [B, Np, Np] representing, respectively, the geometry distance and feature similarity between every two points.

Radius-based geometry neighborhood selections are typically more robust than k-nearest neighbor in a non-uniform sampling of cloud data. However, feature neighborhoods may dynamically shift and be hard to encircle. Therefore, multiple radii are used the geometry domain and multiple k-nearest neighbor algorithms are used in the feature domain to collect multiple scales of neighbor indices.

The MNEW submodules 300 each gather original features to compose two initial neighborhood embedding matrices $X_g^0$ and $X_f^0$, each with a shape [B, $N_p$, $N_{ng}$, $D_{embed}$] and [B, $N_p$, $N_{nf}$, $D_{embed}$], where ng=$\Sigma r_i$ representing the number of accumulated neighbors in multiple-radius geometry space, and nf=$\Sigma k_i$ representing the number of accumulated neighbors in multiple k-nearest neighbor feature space. Each element is embedded in the matrices $X_g^0$ and $X_f^0$, as shown below in Equation 1:

$$f(x_i, n_j) = f(x_{n_j}, x_{n_j} - x_i), x_{i,n_j} \in (X_g^0 \cup X_f^0) \quad \text{Equation 1}$$

In Equation 1, $x_i$ denotes the $i^{th}$ query point, and $x_{n_j}$ denotes the $j^{th}$ neighboring points. Because the geometry distance matrix $D_g$ (shape [B, $N_p$, $N_{ng}$, 1]) and feature similarity matrix $D_f$ (shape [B, $N_p$, $N_{ng}$, 1], represented by pairwise distances in the feature space) are already computed and gathered, a transformation function $T(d_i, n_j) = w_i, n_j \cdot f(d_i, n_j)$ can be applied to obtain learning-based ($w_i$, $n_j$) attention weights and apply on $X_g^0$ and $X_f^0$, resulting with attended embedding $X_g^a$ and $X_f^a$, as shown in Equation 2:

$$X_g^a = T(D_g) \cdot X_g^0$$

$$X_f^a = T(D_g) \cdot X_f^0 \quad \text{Equation 2}$$

The neighborhood sparsity can next be calculated using Equations 3 and 4 that follow:

$$\mathbb{P}(x_i, n_j | \mu, \sigma^2) = \frac{1}{\sqrt{2\pi\sigma^2}} \exp\left[-\frac{(x_{n_j}-x_i)^2}{2\sigma^2}\right] \quad \text{Equation 3}$$

$$S(x_i, n_j | \mu, \sigma^2) = \left(\frac{1}{N_n}\log\left[\sum_{n_j \in N_n} \mathbb{P}(x_i, n_j | \mu, \sigma^2)\right]\right)^{-1} \quad \text{Equation 4}$$

In Equation 3, $\mathbb{P}(x_i, n_j | \mu, \sigma^2)$ is similar to a Gaussian probability density function computed for every neighbors $x_{n_j}$ with respect to the query point $x_i$. In Equation 4, $S(x_i, n_j)$ is the estimated sparsity, which is an inverse of the average density, where we also take the log-scale value to obtain a better sparsity distribution. Geometry sparsity $S_g$ and feature sparsity $S_f$ are computed separately, which are transformed as the weighting factor for the activation of the 2D convolution. The weighted outputs $X_g^w$ (shape [B, $N_p$, $N_{ng}$, $D_{conv}$]) and $X_f^w$ (shape [B, $N_p$, $N_{ng}$, $D_{conv}$]) are given by Equations 5:

$$X_g^w = T(S_g) \cdot h(X_g^a)$$

$$X_f^w = T(S_f) \cdot h(X_f^a) \quad \text{Equations 5}$$

After concatenating the neighborhood information from the geometry and feature domain, an average pooling operation is followed to aggregate a feature vector for each query point, which yields the output of the MNEW submodules 300 as $X_{mnew}^{pit}$ with shape [B, $N_p$, $N_{ng}$, $D_{conv}$], as shown in Equation 6:

$$X_{mnew}^{out} = \frac{1}{N_p}\sum_{i \in N_p}(X_g^w \oplus X_f^w) \quad \text{Equation 6}$$

A loss function may be used, which is a combination of softmax cross-entropy loss $\mathcal{L}_{CE}$ and adjusted regularization loss $\mathcal{L}_{Reg}$ by $\lambda$. Because the task is semantic segmentation only (i.e., no instance-level labels), there is little to no discriminative loss, as shown in Equation 7:

$$\mathcal{L}_{Total} = \mathcal{L}_{Total} = \mathcal{L}_{CE} + \lambda \mathcal{L}_{Reg} \quad \text{Equation 7}$$

In this way, the MNEW module 114-1 refrains from performing subsampling and interpolation processing, which differs from other point cloud data processing, for instance, that which is based on a hierarchical encoder-decoder structure.

Compared with PointNet whose feature contains pointwise and global information, the MNEW module 114-1 also include local neighborhood features. Unlike other techniques that collect neighbors in feature space only, the MNEW module 114-1 embeds neighbor points in both the geometry and feature domains. In terms of the neighborhood embedding, the MNEW module 114-1 adopts multi-scaling in multiple domains. This distinct with all other processes for handling point cloud data where neighbors are collected in only a single domain (e.g., either geometry or feature but not both). There may exist overlapping points selected by the MNEW module 114-1 in both geometry and feature neighborhoods. However, the multiple-domain distance and sparsity are calculated and transformed separately, which yield different weighting effects for the learning results.

Example Process

Figure 4:
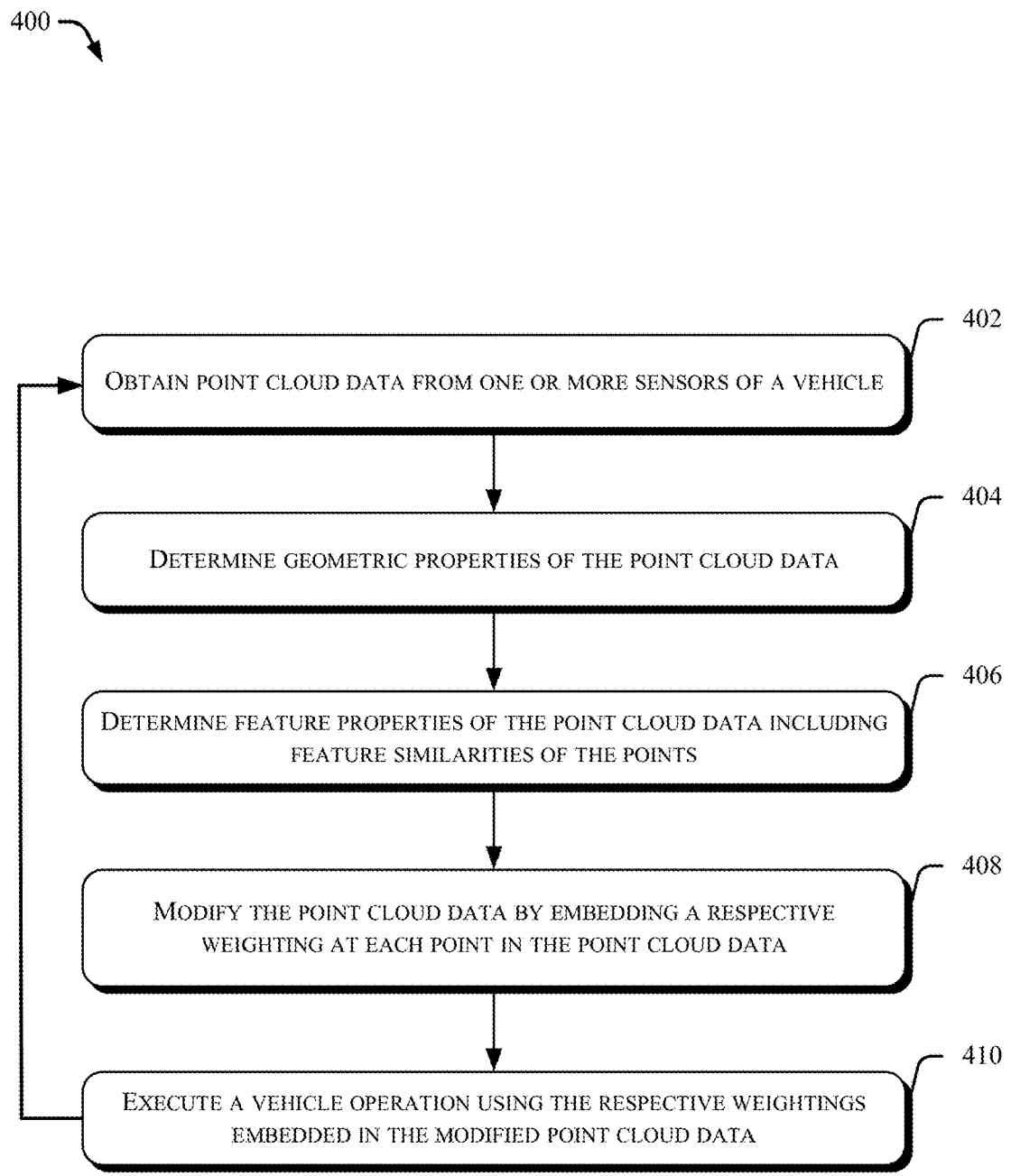
FIG. 4 illustrates an example method for processing point clouds through multi-domain neighborhood embedding and weighting.

FIG. 4 illustrates an example method 400 for processing point clouds through multi-domain neighborhood embedding and weighting. FIG. 4 is described in the context of the MNEW module 114-1, the automotive system 104, and the vehicle 102. The method 400 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to elements of the FIGS. 1 through 3, reference to which is made for example only. The techniques are not limited to performance by one entity or multiple entities.

At 402, point cloud data is obtained from one or more sensors of a vehicle. For example, the automotive system 104 includes the processor 108 and receives, via the sensor interface 112, and from the sensors 106, point cloud data captured by the sensors 106 as the vehicle 102 is performing a vehicle operation (e.g., autonomously navigating down a roadway).

At 404, geometric properties of the point cloud data are determined. For example, the MNEW module 114 executes on the processor 108 and by grouping geometry neighbors in the point cloud data, the MNEW module 114 produces the geometry neighborhood domain 202-1.

At 406, feature properties of the point cloud data are determined including feature similarities of the points. For example, the MNEW module 114 executes on the processor 108 and by through grouping feature neighbors based on similarities (e.g., using multiple k-nearest neighbors algorithms) that change across different network layers, the MNEW module 114 generates a feature neighborhood domain 202-2.

At 408, the point cloud data is modified by embedding a respective weighting at each point in the point cloud data. For example, the processor determines a sparsity for each point in the two domains 202-1 and 202-2. This can include determining a geometric sparsity of that point in the geometry neighborhood domain and determining a feature sparsity of that point in the feature neighborhood domain. The geometry sparsity 204-1 and the feature sparsity 204-2 at each point is transformed into the weighting factors 206-1 and 206-2, which are applied to the raw point cloud data from the raw data store 116. Each respective weighting is based on the geometric sparsity and the feature sparsity, rather than only being based on one or the other, which improves object detections and classifications.

The method 400, can be repeated to improve its effectiveness in accurately weighting point cloud data. This can include recomputing weightings to be applied to the point cloud data. Feature properties of the modified point cloud data are determined, as are geometric properties of the modified point cloud data. The processor 108 can further modify previously modified point cloud data using new weightings based in part on the geometric properties of the modified point cloud data and the feature properties of the modified point cloud data.

At 410, a vehicle operation is executed using the respective weightings embedded in the modified point cloud data. For example, the automotive system 104 performs a vehicle function based on objects detected from the segmented point cloud data store 118. With weightings embedded in the data, the automotive system 104 can use sparsely populated point cloud data to confidently identify and classify objects and other obstacles that would otherwise impede the vehicle 102 from performing an autonomous or semi-autonomous perception-navigation task.

Example Point Cloud Data

Figures 1, 5:
Figures 2, 5:
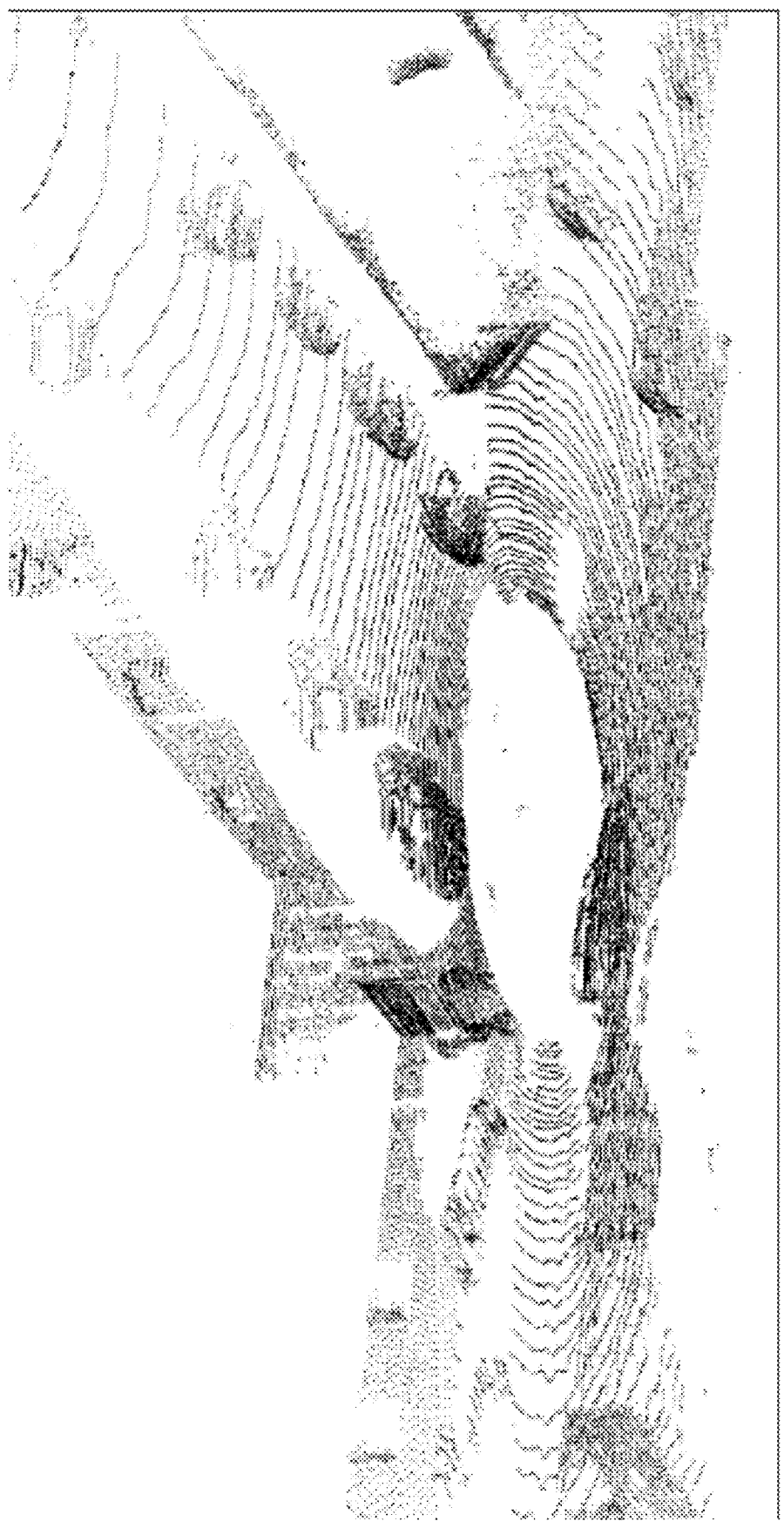
Figures 1, 6:
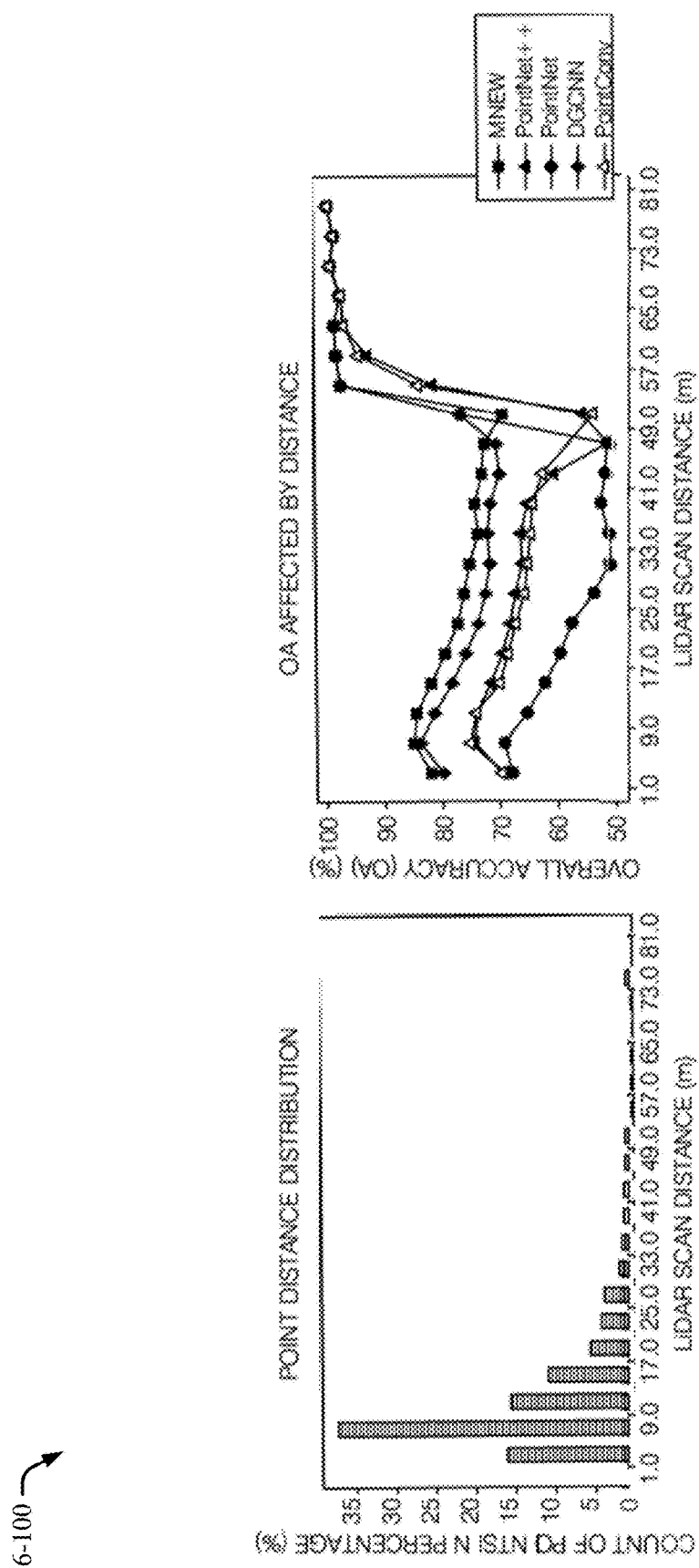
Figures 2, 6:
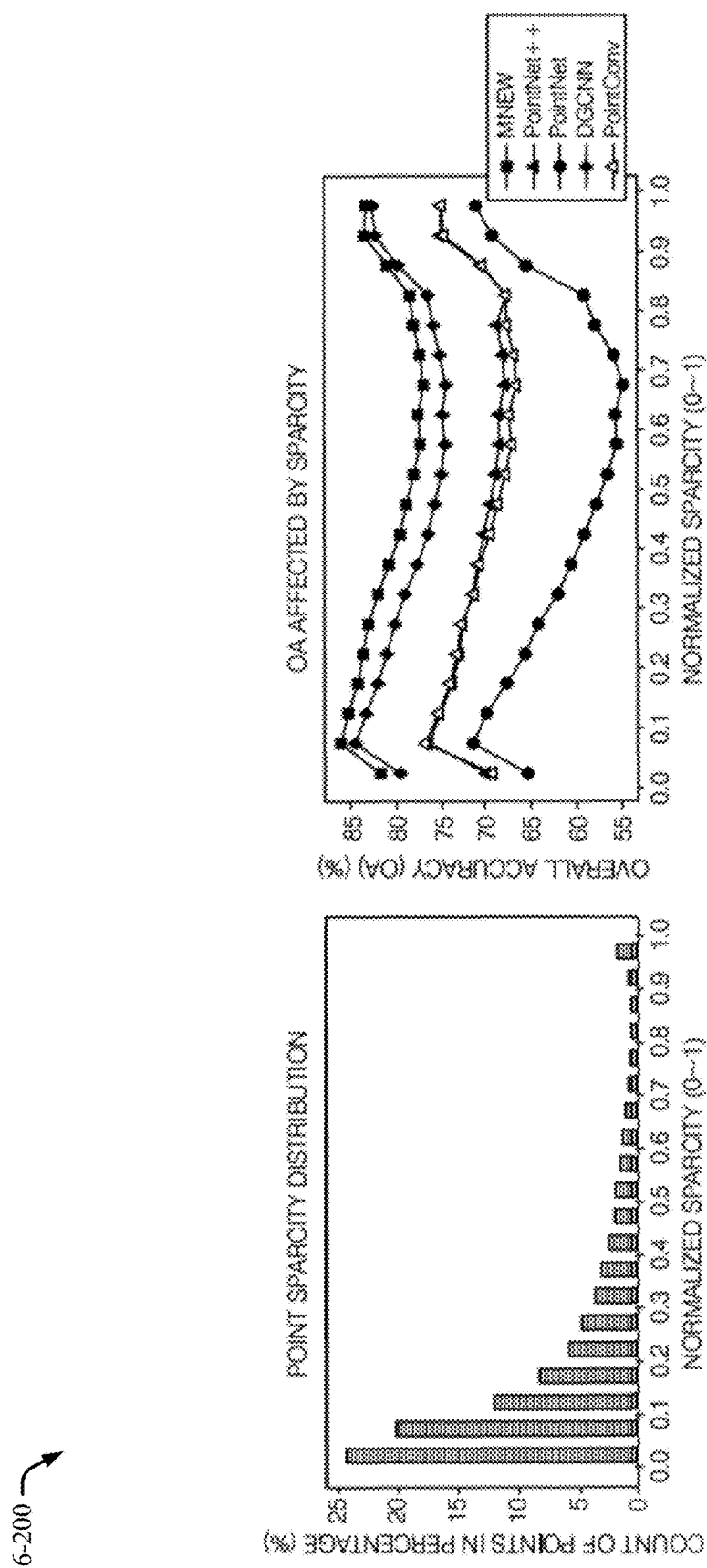

FIG. 5-1 illustrates an example of a dense point cloud 500-1 processed by an automotive system configured to process point clouds using multi-domain neighborhood embedding and weighting. FIG. 5-2 illustrates an example of a sparse point cloud 500-2 processed by an automotive system configured to process point clouds using multi-domain neighborhood embedding and weighting. FIGS. 5-3 and 5-4 are grey scale versions 500-3 and 500-4 of the point clouds 500-1 and 500-2 shown in FIGS. 5-1 and 5-2, respectively. FIGS. 5-5 and 5-6 are black and white versions 500-5 and 500-6 of the point clouds shown in FIGS. 5-1 and 5-2, respectively.

Example Performance

FIG. 6-1 illustrates an example point cloud distribution and performance variation by distance. FIG. 6-2 illustrates an example point cloud distribution and performance variation by sparsity. In particular, when applied to the application of autonomous driving task, the MNEW 114-1 can segment even sparse point cloud data at the raw data store 116. FIGS. 6-1 and 6-2 show the effectiveness of the MNEW module 114-1 for points at different distances (e.g., with respect to a LiDAR sensor as one of the sensors 106) and sparsity (with respect to nearby points).

In FIGS. 6-1 and 6-2, distribution histograms of distance and sparsity are demonstrated, and performance variations are investigated. Observe in FIG. 6-1, there exists an abrupt performance elevation at approximately fifty meters distance. To be explicit, points at far distances (e.g., greater than fifty meters) may be limited in quantity but are generally involved with well-learned classes (e.g., road, building, terrain) which contains relatively higher percentages of samples.

In FIG. 6-2, what is shown, is as the sparsity increases, the performance of the MNEW module 114-1 starts to decrease until 0.7~0.8 and then increases. This is associated with the sparsity distribution histogram, implying that the number of samples affect the performance.

Because the sparsity distribution for dense datasets is more even than for sparse datasets, the MNEW module 114-1 infers information that improves the effectiveness of the data. For the neighborhood selection, the MNEW module 114-1 compares the neighbors collected by geometry location and feature similarity, in both domains. For the attention and weighting, the MNEW module 114-1 may optionally enable the factor of neighbor distance and local sparsity in geometry and feature domain, and optionally set them as fixed values ($D_g$, $D_f$, $S_g$, $S_f$) or transform them.

Some additional examples of implementing multi-domain neighborhood embedding and weighting for point cloud processing are described in the following section of examples.

Example 1. A method comprising: obtaining point cloud data from one or more sensors of a vehicle; determining geometric properties of the point cloud data by at least: determining geometric distances between points in the point cloud data; and determining a sparsity of the point cloud data at each of the points; determining feature properties of the point cloud data including feature similarities of the points; modifying the point cloud data by embedding a respective weighting at each point in the point cloud data, the respective weighting being based on: the geometric distances that are between that point and other points in the point cloud data; the sparsity of the point cloud data at that point; and the feature similarities of that point and the other points in the point cloud data; and responsive to modifying the point cloud, executing a vehicle operation using the respective weightings embedded in the modified point cloud data.

Example 2. The method of any preceding example, wherein the point cloud data includes a same quantity of sampled points after modifying the point cloud data as before modifying the point cloud data.

Example 3. The method of any preceding example, wherein the point cloud data comprises sparse data.

Example 4. The method of any preceding example, wherein the point cloud data comprises dense data.

Example 5. The method of any preceding example, wherein determining the geometric properties of the point cloud data comprises grouping geometry neighbors in the point cloud data to produce a geometry neighborhood domain.

Example 6. The method of any preceding example, wherein determining the feature properties of the point cloud data comprises grouping feature neighbors in the point cloud data to produce a feature neighborhood domain.

Example 7. The method of any preceding example, further comprising: determining the sparsity of the point cloud data at that point, wherein the sparsity is determined by: determining a geometric sparsity of that point in the geometry neighborhood domain; and determining a feature sparsity of that point in the feature neighborhood domain, wherein the respective weighting is further based on the geometric sparsity and the feature sparsity.

Example 8. The method of any preceding example, further comprising: determining geometric properties of the modified point cloud data; determining feature properties of the modified point cloud data; modifying the modified point cloud data using weighting based in part on the geometric properties of the modified point cloud data and the feature properties of the modified point cloud data.

Example 9. A system comprising means for performing the method of any of the preceding examples.

Example 10. A computer readable storage medium comprising instructions that, when executed, configure a processor to perform the method of any of the preceding examples.

Conclusion

While various embodiments of the disclosure are described in the foregoing description and shown in the drawings, it is to be understood that this disclosure is not limited thereto but may be variously embodied to practice within the scope of the following claims. From the foregoing Description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining geometric properties of sampled data obtained from one or more sensors of a vehicle by at least determining geometric distances between points in the sampled data;
   determining feature properties of the sampled data including feature similarities of the points;

modifying the sampled data to retain a same quantity of points that are each embedded with a respective weighting, the respective weighting being based on:
the geometric distances that are between that point and other points in the sampled data;
a sparsity of the sampled data at that point; and
the feature similarities of that point and the other points in the sampled data; and
responsive to modifying the sampled data, using the respective weightings embedded in the modified sampled data for enabling execution of a vehicle operation.

2. The method of claim 1, wherein the sampled data includes a same quantity of sampled points after modifying the sampled data as before modifying the sampled data.

3. The method of claim 1, wherein the sampled data comprises sparse data.

4. The method of claim 1, wherein the sampled data comprises dense data.

5. The method of claim 1, wherein determining the geometric properties of the sampled data comprises grouping geometry neighbors in the sampled data to produce a geometry neighborhood domain.

6. The method of claim 5, wherein determining the feature properties of the sampled data comprises grouping feature neighbors in the sampled data to produce a feature neighborhood domain.

7. The method of claim 6, further comprising:
determining the sparsity of the sampled data at that point, wherein the sparsity is determined by:
determining a geometric sparsity of that point in the geometry neighborhood domain; and
determining a feature sparsity of that point in the feature neighborhood domain,
wherein the respective weighting is further based on the geometric sparsity and the feature sparsity.

8. The method of claim 1, further comprising:
determining geometric properties of the modified sampled data;
determining feature properties of the modified sampled data;
modifying the modified sampled data using weighting based in part on the geometric properties of the modified sampled data and the feature properties of the modified sampled data.

9. A system comprising at least one processor configured to:
determine geometric properties of sampled data obtained from one or more sensors of a vehicle by at least determining geometric distances between points in the sampled data;
determine feature properties of the sampled data including feature similarities of the points;
modify the sampled data to retain a same quantity of points that are each embedded with a respective weighting, the respective weighting being based on:
the geometric distances that are between that point and other points in the sampled data;
a sparsity of the sampled data at that point; and
the feature similarities of that point and the other points in the sampled data; and
responsive to modifying the sampled data, using the respective weightings embedded in the modified sampled data for enabling execution of a vehicle operation.

10. The system of claim 9, wherein the sampled data includes a same quantity of sampled points after modifying the sampled data as before modifying the sampled data.

11. The system of claim 9, wherein the sampled data comprises sparse data.

12. The system of claim 9, wherein the sampled data comprises dense data.

13. The system of claim 9, wherein the at least one processor is configured to determine the geometric properties of the sampled data comprises grouping geometry neighbors in the sampled data to produce a geometry neighborhood domain.

14. The system of claim 13, wherein the at least one processor is configured to determine the feature properties of the sampled data comprises grouping feature neighbors in the sampled data to produce a feature neighborhood domain.

15. The system of claim 14, wherein the at least one processor is further configured to:
determine the sparsity of the sampled data at that point, wherein the sparsity is determined by:
determine a geometric sparsity of that point in the geometry neighborhood domain; and
determine a feature sparsity of that point in the feature neighborhood domain,
wherein the respective weighting is further based on the geometric sparsity and the feature sparsity.

16. The system of claim 9, wherein the at least one processor is further configured to:
determine geometric properties of the modified sampled data;
determine feature properties of the modified sampled data;
modify the modified sampled data using weighting based in part on the geometric properties of the modified sampled data and the feature properties of the modified sampled data.

17. A non-transitory computer-readable storage medium comprising instructions that when executed configure a processor to:
determine geometric properties of sampled data obtained from one or more sensors of a vehicle by at least determining geometric distances between points in the sampled data;
determine feature properties of the sampled data including feature similarities of the points;
modify the sampled data to retain a same quantity of points that are each embedded with a respective weighting, the respective weighting being based on:
the geometric distances that are between that point and other points in the sampled data;
a sparsity of the sampled data at that point; and
the feature similarities of that point and the other points in the sampled data; and
responsive to modifying the sampled data, using the respective weightings embedded in the modified sampled data for enabling execution of a vehicle operation.

18. The computer-readable storage medium of claim 17, wherein the sampled data includes a same quantity of sampled points after modifying the sampled data as before modifying the sampled data.

19. The computer-readable storage medium of claim 17, wherein the sampled data comprises sparse data.

20. The computer-readable storage medium of claim 17, wherein the sampled data comprises dense data.

* * * * *